United States Patent
Yang et al.

(10) Patent No.: US 7,333,228 B2
(45) Date of Patent: Feb. 19, 2008

(54) PRINT CONTROL SYSTEM AND COMPUTER PROGRAM STORED IN A COMPUTER READABLE MEDIUM

(75) Inventors: Hong Yang, Ibaraki-ken (JP); Hideki Terasawa, Ibaraki-ken (JP); Noriaki Nagao, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 1003 days.

(21) Appl. No.: 10/440,137

(22) Filed: May 19, 2003

(65) Prior Publication Data

US 2003/0214672 A1    Nov. 20, 2003

(30) Foreign Application Priority Data

May 20, 2002    (JP)    ............................. 2002-144604

(51) Int. Cl.
*G06F 3/12* (2006.01)
*G06K 15/00* (2006.01)

(52) U.S. Cl. .................... 358/1.15; 358/1.13; 358/1.14

(58) Field of Classification Search ......... 358/1.1–1.18
See application file for complete search history.

(56) References Cited

U.S. PATENT DOCUMENTS

| | | | |
|---|---|---|---|
| 6,476,927 B1 | 11/2002 | Schwarz, Jr. | |
| 6,657,741 B1 | 12/2003 | Barry et al. | |
| 7,046,383 B1 * | 5/2006 | Ueda et al. | ................ 358/1.15 |
| 2001/0043357 A1 | 11/2001 | Owa et al. | |
| 2001/0048833 A1 | 12/2001 | Katsuda et al. | |
| 2002/0054310 A1 | 5/2002 | Nakagiri et al. | |
| 2003/0038962 A1 | 2/2003 | Shimada | |
| 2004/0061896 A1 | 4/2004 | Shimada | |

FOREIGN PATENT DOCUMENTS

| | | |
|---|---|---|
| EP | 0 893 753 A2 | 1/1999 |
| EP | 0 939 361 A2 | 9/1999 |
| JP | 10-087085 | 4/1998 |
| JP | 10149263 | 6/1998 |
| JP | 11-203077 A | 7/1999 |
| JP | 2000-81960 | 3/2000 |
| JP | 2000-81960 A | 3/2000 |
| WO | WO 99/38068 | 7/1999 |
| WO | WO-97/06481 | 3/2000 |

OTHER PUBLICATIONS

European Search Report dated Jun. 17, 2005 Application No. EP 03 01 1342.

* cited by examiner

*Primary Examiner*—Douglas Q. Tran
(74) *Attorney, Agent, or Firm*—Nixon Peabody LLP; Donald R. Studebaker

(57) ABSTRACT

One of printers linked with each other by way of a network is selected according to a printing condition for a given printing job. System information on whether the selected printer makes print in a plate printing system or in a non-plate printing system is obtained. The given printing job is output to the selected printer so that the selected printer makes copies by page when the selected printer makes print in a plate printing system.

9 Claims, 3 Drawing Sheets

PRINT CONTROL SYSTEM AND COMPUTER PROGRAM STORED IN A COMPUTER READABLE MEDIUM

BACKGROUND OF THE INVENTION

1. Field of the Invention

This invention relates to a print control system, and more particularly to a print control system for controlling print in a print system comprising a plurality of printers linked by a network. This invention also relates to a computer program for causing a computer to execute the processing done by the print control system.

2. Description of the Related Art

A laser beam printer, an ink jet printer, a dot printer, a stencil printer, and the like are employed in offices.

The stencil printer works in a printing system different from that of the other printers. For example, the stencil printer requires a form plate (a stencil) and printers other than the stencil printer requires no form plate. In the case of a stencil printer, a stencil is made on the basis of image data which is read by an image read-out system or transferred from an external instrument such as a computer, the stencil is wound around a printing drum and printing is effected by transferring ink supplied inside the printing drum to printing papers through the stencil. Whereas, in the case of a laser beam printer, a photosensitive drum is image wise exposed to a laser beam, toner is caused to adhere to the exposed part of the photosensitive drum, and the toner on the photosensitive drum is transferred to a printing paper, whereby printing is effected with no form plate.

Since these printers work in different printing systems, the time and/or cost required to output one copy greatly differs from each other depending on the type of the printer.

That is, in the case of the stencil printer, the output time per one copy is shortened as the total number of copies to be printed increases and the cost per one copy is reduced as the total number of copies to be printed increases since it is necessary to make a stencil and to wind the stencil around the printing drum irrespective of the number of copies to be printed. On the other hand, in the case of the laser beam printer, the output time per one copy and the cost per one copy are both constant irrespective of the number of copies to be printed. Accordingly, the stencil printer is advantageous over the laser beam printer (or other printers) when the total number of copies to be printed (of the same contents) is large whereas the non-stencil printer (a printer which works in a printing system different from the stencil printer, e.g., the laser beam printer) is advantageous over the stencil printer when the total number of copies to be printed (of the same contents) is small.

Recently, great development of network technology has linked a plurality of printers with a computer or the like by way of a network so that the computer can transfer printing data to any one of the printers to cause the printer to print on the basis of the printing data.

Since the user who transfers the printing data generally selects the printer, it is necessary for the user to have a knowledge of features of the printers linked with the network in order to select a printer suitable for his or her printing job. Even if the user has a sufficient knowledge of features of the printers, it is troublesome to select a printer each time image data is printed.

In order to realize an efficient printing system where the user need not select a printer, there has been proposed, as disclosed in Japanese Unexamined Patent Publication No. 2000-81960, a system in which a printer is automatically selected according to the printing condition for the printing job. For example, the stencil printer is used when the number of copies to be printed is large, whereas the non-stencil printer, e.g., a laser beam printer is used when the number of copies to be printed is small.

In order to shorten the output time per one copy and to reduce the cost per one copy as the total number of copies to be printed increases in the stencil printer, it is necessary to print a number of copies at one time. That is, when a number of sets of copies, each comprising a plurality of pages, are printed by the use of the stencil printer, it is necessary to print the copies by page in order to shorten the output time per one copy and to reduce the cost per one copy as the total number of copies to be printed increases. Whereas, when a number of sets of copies, each comprising a plurality of pages, are printed by the use of the non-stencil printer, preferably, the copies are printed by set like page 1, page 2, page 3 . . . , page 1, page 2, page 3 . . . , page 1, page 2, page 3 . . . in order to save sorting labor after printing. When printing is made under an instruction from an application software installed in a computer, whether printing is to be made in a by-set mode or in a by-page mode can be selected though the by-set mode is generally set in the default.

Accordingly, when a stencil printer is designated as an output printer in an environment where stencil printers and laser beam printers are linked by way of a network mingling with each other, the by-set mode which has been set in the default must be changed to the by-page mode in order to efficiently make printing by the stencil printer. On the other hand, when a laser beam printer is designated as an output printer and the by-set mode has not been set in the default in the environment, the printing mode must be set to the by-set mode in order to save sorting labor after printing.

In the aforesaid printing system, disclosed in Japanese Unexamined Patent Publication No. 2000-81960, where a printer is automatically selected according to the number of copies, the printing mode must be manually switched according to the selection of the system. That is, when the system selects a stencil printer, the user must manually set the printing mode to the by-page mode, which makes it infeasible to realize a system which allows for the user to constantly efficiently make printing without being conscious of which printer is to be employed and after all cannot save the user's labor.

SUMMARY OF THE INVENTION

In view of the foregoing observations and description, the primary object of the present invention is to provide a print control system which, in a system comprising a printer such as a stencil printer, which requires a form plate and a printer such as a laser beam printer which requires no form plate, linked by way of a network mingling with each other, can cause one of the printers to execute a printing job according to the printing condition thereof so that the printing job can be constantly efficiently executed without necessity for the user to set a printing mode.

Another object of the present invention is to provide a computer program for causing a computer to execute the processing done by the print control system.

The above object of the present invention can be accomplished by a print control system comprising a printer selection means which selects one of printers linked with each other by way of a network according to a printing condition for a given printing job, a system information obtaining means which obtains system information on whether the printer selected by the printer selection means makes print in a plate printing system or in a non-plate printing system, and an output means which outputs said given printing job to the selected printer so that the selected printer makes copies by page when the selected printer makes print in a plate printing system.

The "printing job" means data which is output from an application software installed in a computer and includes printing data and a printing condition. The "printing condition" includes the number of copies to be printed, the printing mode representing whether the copies are to be printed in the by-page mode or in the by-set mode, and the like.

The "printer selection means" selects one of the printers which executes the printing job on the basis of at least one printing condition. For example, when the number of copies to be printed is larger than a predetermined threshold value, the printer selection means selects the plate printing printer (the printer which makes print in the plate printing system) (need not be necessarily the plate printing printer but may be the printer which makes print in the non-plate printing system), and when the number of copies to be printed is not larger than a predetermined threshold value, the printer selection means selects the non-plate printing printer (the printer which makes print in the non-plate printing system) (need not be necessarily the non-plate printing printer but may be the plate printing printer).

The "plate printing" is printing which requires a form plate and the "non-plate printing" is printing which requires no form plate. The "plate printing printer" is typically a stencil printer, and the "non-plate printing printer" is, for instance, a laser beam printer, a ribbon printer, an ink jet printer, a dot printer or the like.

The output means may be of any type so long as it can output said given printing job to the selected printer so that the selected printer makes copies by page when the selected printer makes print in a plate printing system. For example, the output means may be of a type which edits the printing mode included in the printing condition for the printing job into the by-page mode and outputs the printing job having an edited printing condition to the selected printer, or of a type which separates the printing data of the printing job by page, combines the separated printing data for each page with the printing condition for the printing job, thereby making a plurality of separated printing jobs and outputs the separated printing jobs to the selected printer.

To edit the printing mode into the by-page mode is equivalent to set the printing mode of the printing job to the by-page mode. Accordingly, the printing mode may be set to the by-page mode irrespective of the original printing mode or the printing mode may be changed to the by-page mode only when the printing mode has been originally set to the by-set mode.

It is preferred that the output means outputs said given printing job to the selected printer so that the selected printer makes copies by set when the selected printer makes print in a non-plate printing system. In this case, the output means may be of any type so long as it can output said given printing job to the selected printer so that the selected printer makes copies by set when the selected printer makes print in a non-plate printing system. For example, the output means may be of a type which edits the printing mode included in the printing condition for the printing job into the by-set mode and outputs the printing job having an edited printing condition to the selected printer, or of a type which repeats outputting printing data of the printing job page by page the same number of times as the number of sets to be made.

To edit the printing mode into the by-set mode is equivalent to set the printing mode of the printing job to the by-set mode. Accordingly, the printing mode may be set to the by-set mode irrespective of the original printing mode or the printing mode may be changed to the by-set mode only when the printing mode has been originally set to the by-page mode.

The print control system of the present invention may be further provided with a system information storage means which stores whether each of the printers makes print in a plate printing system or in a non-plate printing system, and the system information obtaining means may obtain the system information from the system information storage means.

The system information storage means may be of any type so long as it can provide the printing systems of the respective printers. For example, the system information storage means may directly store each of the printers and the printing system thereof related to each other, or may store, for instance, only the plate printing printers so that the system information obtaining means knows that the printers whose printing systems are not stored by the system information storage means are the non-plate printing printers. Of course, the system information storage means may store only the non-plate printing printers so that the system information obtaining means knows that the printers whose printing systems are not stored by the system information storage means are the plate printing printers. Further, each printer may be identified on the basis of the name of the printer, or a nick name or a number of the printer which can be understood by the system information obtaining means. Similarly, the system information may be based on the name of the printing system "plate printing system" or "non-plate printing system", or on a digit, a sign or a flag representing the printing system.

Said another object of the present invention is accomplished by a computer program which causes a computer to perform steps of selecting one of printers linked with each other by way of a network according to a printing condition for a given printing job, obtaining system information on whether the selected printer makes print in a plate printing system or in a non-plate printing system, and outputting said given printing job to the selected printer so that the selected printer makes copies by page when the selected printer makes print in a plate printing system.

The computer program may be an independent utility or at least a part of the computer program may be incorporated in the operating system of the computer.

The computer program may be recorded in a computer readable medium so that the computer can perform the method when loaded with there cording medium. A skilled artisan would know that the computer readable medium is not limited to any specific type of storage devices and includes any kind of device, including but not limited to CDs, floppy disks, RAMs, ROMs, hard disks, memory cards, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In the print control system of the present invention, since the copies are printed in the by-page mode irrespective of whether the printing mode has been originally set to the by-page mode so long as the plate printing printer is selected, the plate printing printer can be efficiently utilized without necessity of setting by the user.

When the print control system of the present invention is arranged so that the output means outputs said given printing job to the selected printer so that the selected printer makes copies by set when the selected printer makes print in a non-plate printing system, the copies can be printed by set even if the printing mode has been originally set to the by-page mode, and accordingly, labor of manually sorting the copies after printing can be saved.

DESCRIPTION OF THE PREFERRED EMBODIMENTS

Figure 1:
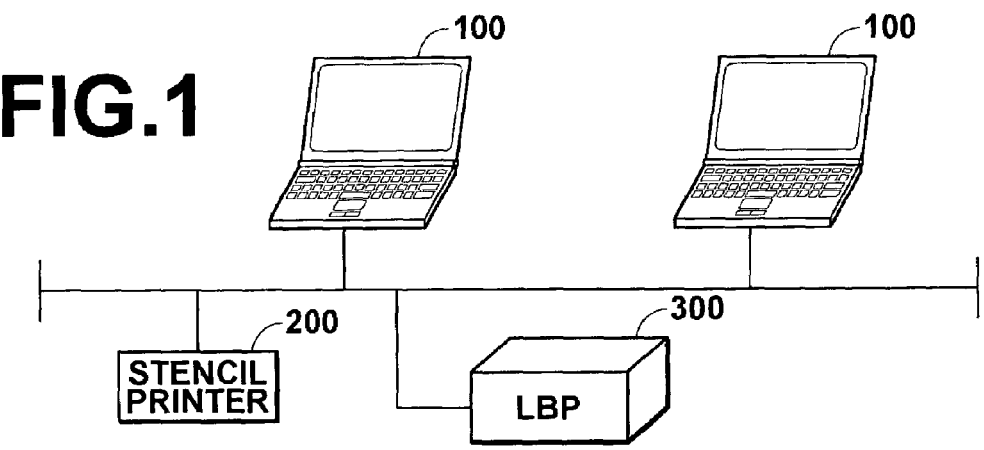
FIG. 1 is a block diagram showing a print system in accordance with an embodiment of the present invention.

In FIG. 1, a print system in accordance with an embodiment of the present invention comprises computers 100 which output a printing job, a stencil printer 200, and LBP (a laser beam printer) 300 which are connected by way of a network. An application software which creates printing data and sets printing condition, printer drivers for the stencil printer 200 and the LBP 300 and a utility for automatically selecting one of the stencil printer 200 and the LBP300 (a computer program in accordance with an embodiment of the present invention) are installed in the computers 100.

Figure 2:
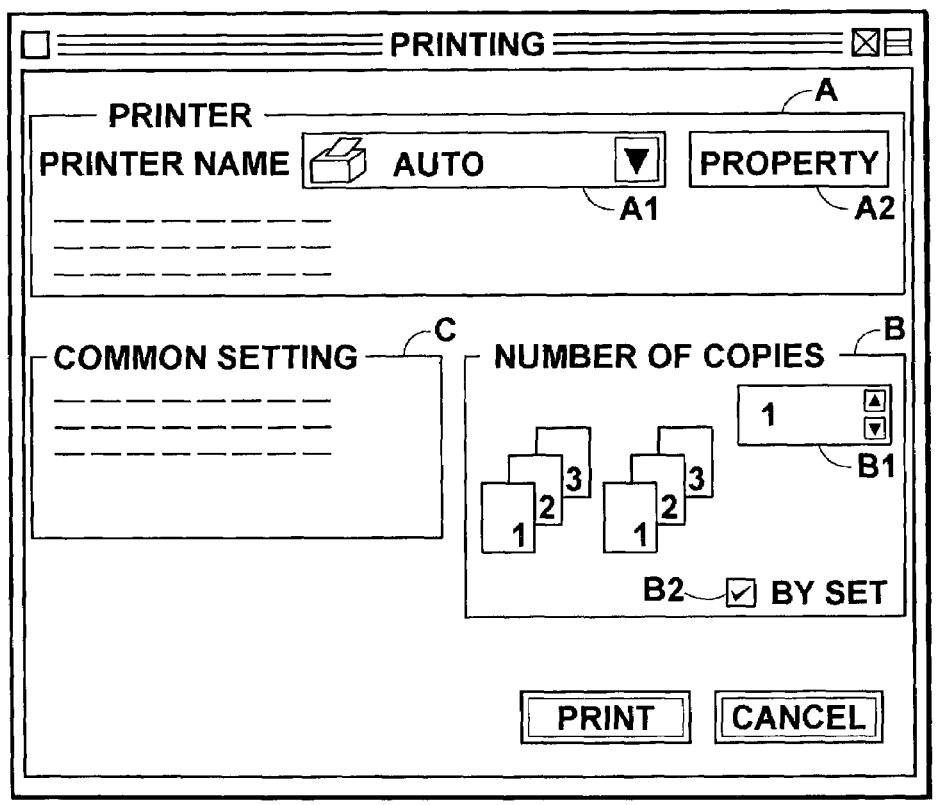
FIG. 2 is a view showing in brief a printing condition setting screen provided by the application software in the print system shown in FIG. 1.

FIG. 2 is a view showing in brief a printing condition setting screen for setting the printing condition for printing data which has been created by the computer 100. As shown in FIG. 2, the printing condition setting screen provided by the application software comprises a printer setting dialog box A for setting a printer to which the printing data is to be output, a copy number setting dialog box B for setting a number of copies to be printed, and a common setting dialog box C for setting other items such as printing-paper-related items and the print area. The printing-paper-related items differ depending on the printer set in the printer setting dialog box A (more strictly depending on the printer driver for the printer).

The printer setting dialog box A is provided with a printer selection field A1. In the printer selection field, the user can select from one of "auto", "stencil printer" and "LBP". The printer which is selected when the user selects "auto" appears depending on the utility (an embodiment of the present invention) installed in the computer 100. The printer setting dialog box A is provided in addition to the printer selection field A1 with a property button A2. When the property button A2 is depressed, properties of the printer selected in the printer selection field A1 are displayed. The properties of the printer are provided by the respective printer drivers and the properties when "auto" is selected are provided by the installed utility as will be described in detail later.

The copy number setting dialog box B is provided with a copy number setting field B1 and a printing mode setting field B2 for setting whether the printing mode is the by-set mode or the by-page mode. When a check mark is put in the check box beside "by set" as shown in FIG. 2, the printing mode is set to the by-set mode and when the check mark is removed, the printing mode is set to the by-page mode.

After the setting in FIG. 2 is completed and an "OK" button is depressed, the application software sends the printing data and the printing conditions to the printer driver for the printer selected in the printer selection field A1 of the printer setting dialog box A (to the utility when "auto" is selected).

Figure 3:
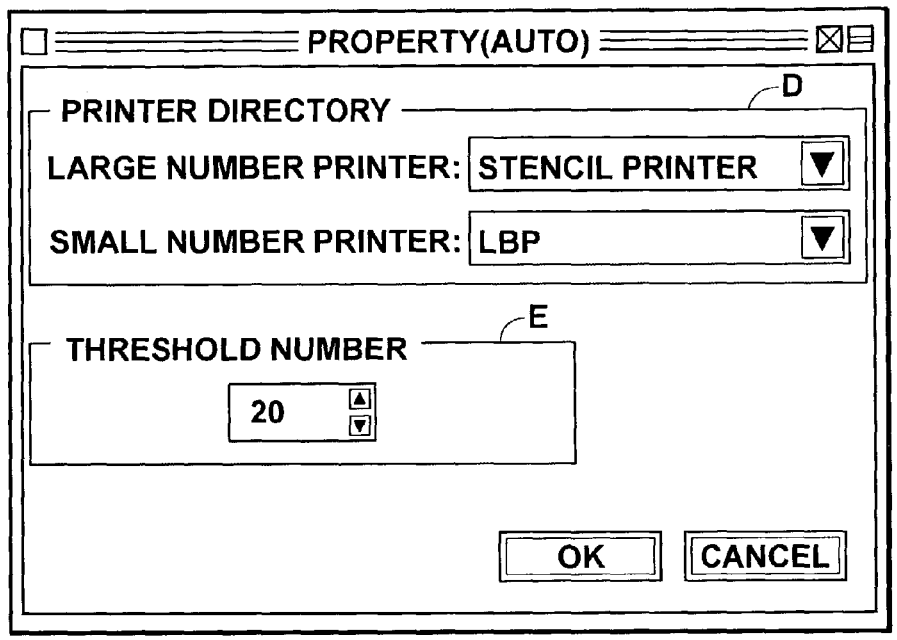
FIG. 3 is a view showing a setting screen provided by a utility in accordance with an embodiment of the present invention.

FIG. 3 shows a screen which appears when "auto" is selected in the printer selection field A1 and the property button A2 is depressed. The screen is provided by the utility (an embodiment of the present invention) installed in the computer 100. In this particular embodiment, the utility automatically selects a printer according to the number of copies to be printed, and the property screen provided by the utility comprises a threshold number setting dialog box E for setting a threshold number of copies on the basis of which the type of printer is selected and a printer directory dialog box D for setting a printer which is to be selected when the number of copies to be printed is larger than the threshold number set in the threshold number setting dialog box E (will be referred to as "the large number printer", hereinbelow) and a printer which is to be selected when the number of copies to be printed is not larger than the threshold number set in the threshold number setting dialog box E (will be referred to as "the small number printer", hereinbelow). The utility in this particular embodiment obtains a list of printers installed in the computer from the operating system of the computer and helps the user select a printer in the printer directory dialog box D.

Figure 4:
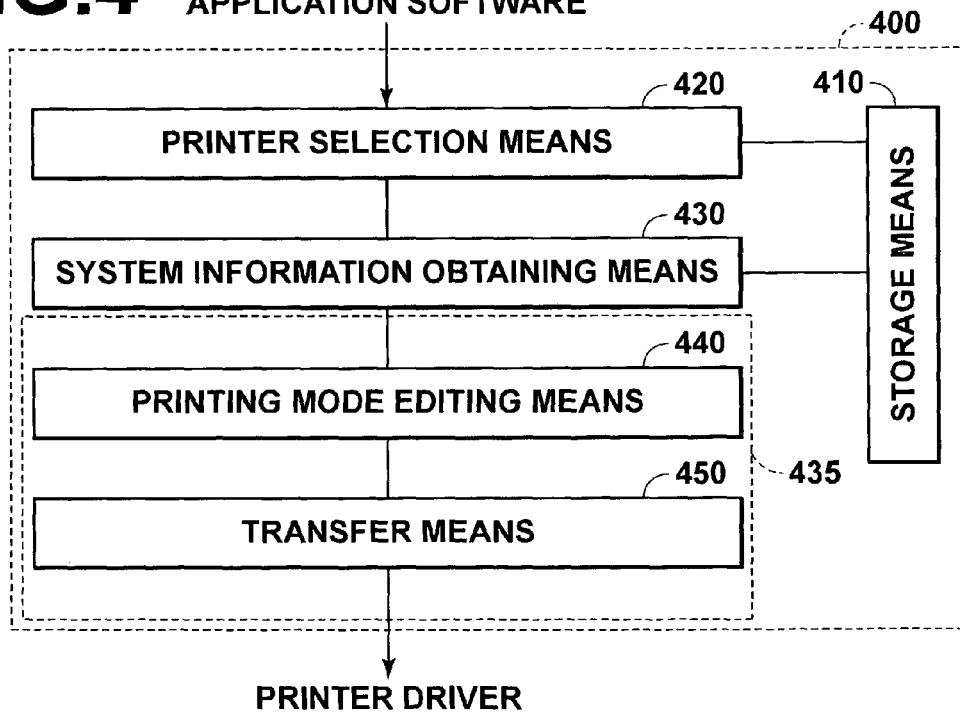
FIG. 4 is a block diagram showing in brief the print control unit formed by installing the utility in a computer.
Figure 5:
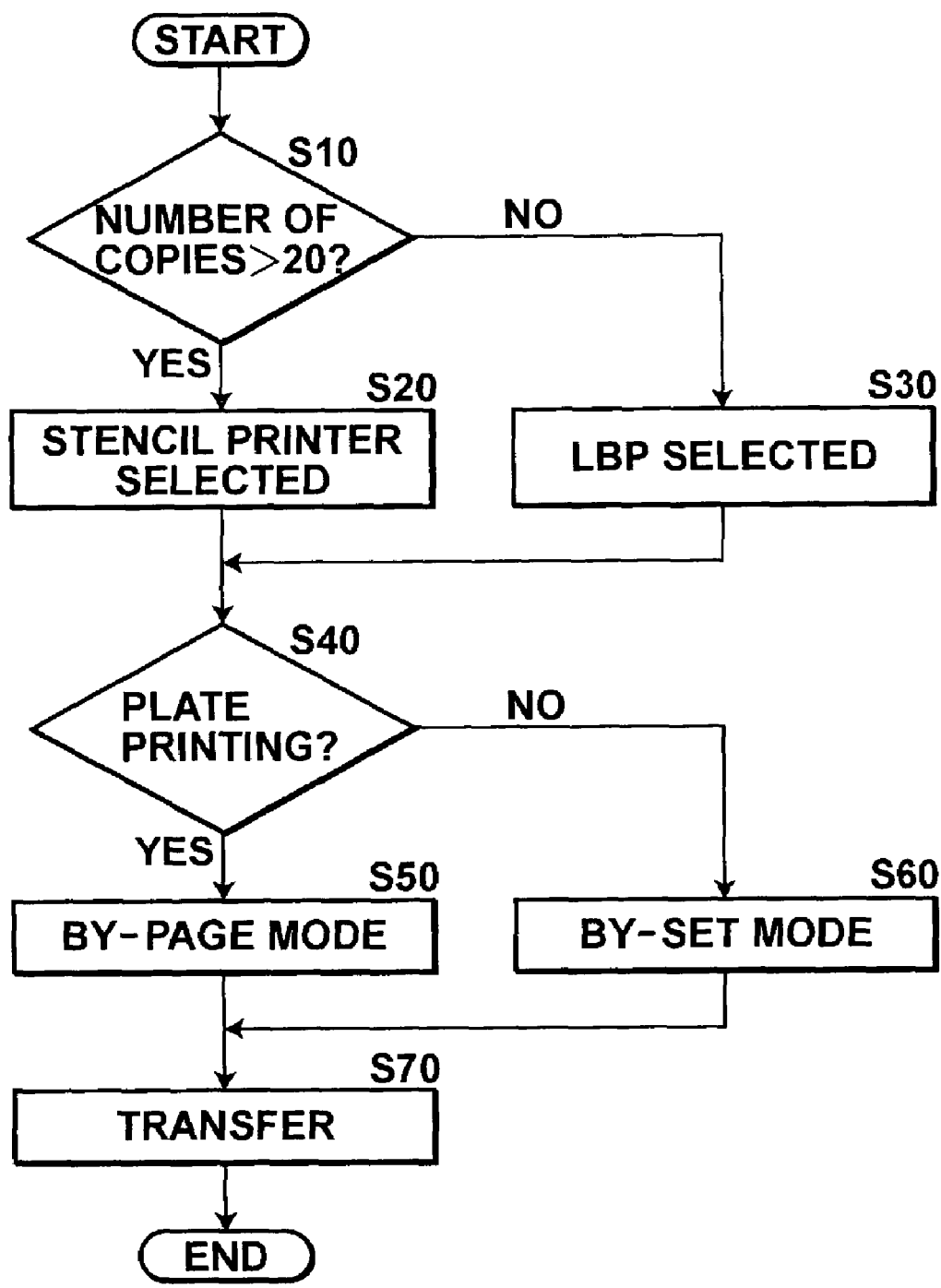
FIG. 5 is a flow chart for illustrating operation of the print control unit shown in FIG. 4.

In the utility of the print system in accordance with this embodiment, the stencil printer 200 has been registered as a plate printing printer. When the utility is installed in the computer 100, the computer 100 can function as a print control unit 400 shown in FIG. 4. FIG. 4 is a view showing in brief the print control unit 400 and FIG. 5 is a flow chart for illustrating operation of the print control unit 400 shown in FIG. 4. Operation of the print control unit 400 will be described with reference to FIGS. 4 and 5, hereinbelow. For the purpose of simplicity, it is assumed that setting in FIG. 3 by the use of the utility has been finished and the operation of the print control unit 400 (the utility) after the time a printing job is sent from the application software will be mainly described. Accordingly, the structure of the print control unit 400 is partly abbreviated in FIG. 4.

As shown in FIG. 4, the print control unit 400 formed by installing the utility in the computer 100 comprises a printer selection means 420 which selects one of the stencil printer 200 and the LBP300 on the basis of the number of copies to be printed included in the printing condition of the printing job sent from the application software, a system information obtaining means 430 which obtains system information on the printing system of the printer selected by the printer selection means 420, an output means 435 which outputs the printing job to the printer driver of the printer selected by the printer selection means 420, and a storage means 410 which stores data necessary for the operation of the printer selection means 420 and the system information obtaining means 430. The output means 435 comprises a printing mode editing means 440 which edits the printing mode included in the printing condition for the printing job on the basis of the system information obtained by the system information obtaining means 430 and a transfer means 450 which transfers the printing job having an edited printing condition to the printer driver for the printer selected by the printer selection means 420. For example, the name of the plate printing printer (stencil printer), the names of the large number printer and the small number printer set in the setting screen shown in FIG. 3, and the threshold number of copies to be printed are stored in the storage means 410.

As shown in FIG. 5, when the print control unit 400 receives a printing job from the application software in the computer 100, the printer selection means 420 detects the number of copies to be printed on the basis of the printing condition of the printing job. (step S10) When the number of copies to be printed is larger than the threshold number of copies (20 in this particular example) stored in the storage means 410, the printer selection means 420 selects the stencil printer 200 (the large number printer). (step S20) When the number of copies to be printed is not larger than the threshold number of copies stored in the storage means 410, the printer selection means 420 selects the laser beam printer 300 (the small number printer). (step S30) Then the system information obtaining means 430 determines whether the printer selected by the printer selection means 420 is a plate printing printer or a non-plate printing printer on the basis of the system information obtained. (step S40) That is, the system information obtaining means 430 refers to the storage means 410 and determines that the printer selected by the printer selection means 420 is a plate printing printer when the printer selection means 420 selects the stencil printer 200, since the stencil printer 200 is stored as a plate printing printer in the storage means 410. Whereas, when the printer selection means 420 selects the laser beam printer 300, the system information obtaining means 430 determines that printer selected by the printer selection means 420 is a non-plate printing printer, since the laser beam printer 300 is not stored as a plate printing printer in the storage means 410. When the system information obtaining means 430 determines that printer selected by the printer selection means 420 is a plate printing printer, the printing mode editing means 440 edits the printing mode included in the printing condition for the printing job into the by-page mode. (step S50) When the system information obtaining means 430 determines that printer selected by the printer selection means 420 is a non-plate printing printer, the printing mode editing means 440 edits the printing mode included in the printing condition for the printing job into the by-set mode. (step S60) Thereafter, the transfer means 450 transfers the printing job with its printing mode thus edited to the printer driver for the selected printer. (S70)

The printer driver causes the corresponding printer to make print according to the printing condition (with the printing mode edited) for the printing job transferred from the transfer means 450 of the print control unit 400.

As can be understood from the description above, in the print system of this embodiment, when the number of copies to be printed designated by a printing job input from the application software installed in the computer 100 is larger than a predetermined threshold number, the stencil printer 200 is selected as the printer to which the printing job is output. Whereas when the number of copies to be printed is not larger than the predetermined threshold number, the laser beam printer 300 is selected as the printer to which the printing job is output. When the stencil printer 200 is selected, the printing mode for the printing job is edited into the by-page mode and when the laser beam printer 300 is selected, the printing mode for the printing job is edited into the by-set mode. Accordingly, when the stencil printer 200 is selected, copies are printed in the by-page mode and when the laser beam printer 300 is selected, copies are printed in the by-set mode irrespective of whether the printing mode for the printing job is set to the by-page mode or the by-set mode by the application software, whereby the plate printing printer or the non-plate printing printer can be selected on the basis of the number of copies to be printed so that the copies can be obtained at a possible lowest cost and in a possible shortest time and at the same time, manual sorting can be eliminated when sets of copies are to be printed by the laser beam printer.

Though a preferred embodiment of the present invention is described above, the print control system of the present invention can be variously modified within the spirit of the present invention.

For example, though, in the print system of the embodiment described above, the print control unit 400 edits the printing mode into the by-page mode when the stencil printer 200 is selected, the print control unit 400 may, instead of editing the printing mode, separate the printing data of the printing job page by page and transfers each of the printing data to the stencil printer 200 together with the printing mode unchanged. With this arrangement, the sets of copies can be printed in the by-page mode by the stencil printer 200. For example, assuming that 30 sets of copies, each set comprising 5 pages, are to be printed, the image data W representing the 5 pages of each set is divided into printing data w1 for a first page, printing data w2 for a second page, printing data w3 for a third page, printing data w4 for a fourth page and printing data w5 for a fifth page, and the 5 pieces of printing data w1 to w5 for pages 1 to 5 are transferred to the stencil printer 200 together with the original printing condition (the number of copies, the printing mode and the like). With this arrangement, the stencil printer 200 makes 30 copies of respective pieces of the printing data w1 to w5 by page in the order of transfer irrespective of whether the printing mode is the by-page mode or the by-set mode since each piece of image data is for a single page.

Similarly, when the laser beam printer 300 is selected, the print control unit 400 may, instead of editing the printing mode, repeat transferring the printing data of the printing job page by page the same number of times as the number of sets to be obtained represented by the printing condition. With this arrangement, the sets of copies can be printed in the by-set mode by the laser beam printer 300. For example, assuming that 15 sets of copies, each set comprising 5 pages, are to be printed, the image data W representing the 5 pages of each set is transferred to the printer driver of the laser beam printer 300 15 times. With this arrangement, the laser beam printer 300 makes 15 sets of copies irrespective of whether the printing mode is the by-page mode or the by-set mode.

Though, in the print system of the embodiment described above, only two printers, the stencil printer 200 and the laser beam printer 300, are linked by way of the network for the purpose of simplicity of description, three or more printers may be linked through the network mingling each other. The non-plate printing printer need not be the laser beam printer 300 but may be any non-plate printing printer such as an ink jet printer, a ribbon printer or a dot printer.

Further, the utility may be modified, for instance, so that a message for verification of the automatically selected printer is displayed before the printing job is output to the selected printer, or so that the printers can be nicknamed.

Though being in the form of a utility to be installed in a computer in the embodiment described above, the program of the present invention, the computer program of the present invention may be at least partly incorporated in the operating system of the computer. For example, the whole computer program of the present invention may be incorporated in the print manager of Windows® or only the function of editing the printing mode may be incorporated in the print manager so that the printing mode is automatically switched to the by-set mode or the by-page mode according to the selected printer.

What is claimed is:

1. A print control system comprising a printer selection means which selects one of printers linked with each other by way of a network according to a printing condition for a given printing job,
    a system information obtaining means which obtains system information on whether the printer selected by the printer selection means makes print in a plate printing system or in a non-plate printing system, and
    an output means which outputs said given printing job to selected printing so that the selected printer makes copies by pages when the selected printer makes print in a plate printing system.

2. A print control system as defined in claim 1 in which the output means edits the printing mode included in the printing condition for the printing mode included in the printing job having an edited printing condition to the selected printer.

3. A print control system as defined in claim 1 in which the output means separates the printing data of the printing job by page, combines the separated printing data for each page with the printing condition for the printing jobs and outputs the separated printed jobs to the selected printer.

4. A print control system as defined in claim 1 in which the outputs means outputs said given printing job to the selected printer so that the selected printer makes copies by set when the selected printer makes print in a non-plate printing system.

5. A print control system as defined in claim 4 in which the output means edits the printing mode included in the printing condition for the printing job into the by-set mode and outputs the printing job having as edited printing condition to the selected printer.

6. A print control system as defined in claim 4 in which repeats outputting printing data of the printing job page by page the same number of times as the number of sets to be made.

7. A print control system as defined in claim 1 further comprising a system information storage means which stores whether each of the printers makes print in a plate printing system or in a non-plate printing system, the system infonnation obtaining means obtaining the system information from the system information storage means.

8. A computer program stored in a computer readable medium which causes a computer to perform steps of:
    selecting one of printers linked with each other by way of a network according to printing condition for a given printing job,
    obtaining system information on whether the selected printer makes print in a plate printing system or in a non-plate printing system, and
    outputting said given printing job to the selected printer so that the selected printer makes copies by page wben the selected primer makes print in a plate printing system.

9. The computer program as defined in claim 8 at least a part of which is incorporated in an operating system of the computer.

* * * * *